3,282,632
CAPACITOR FIRING CIRCUIT WITH
AUTOMATIC RESET
Collins Arsem, Bethesda, Md., assignor to the United
States of America as represented by the Secretary of
the Army
Filed June 26, 1964, Ser. No. 378,475
2 Claims. (Cl. 307—88.5)

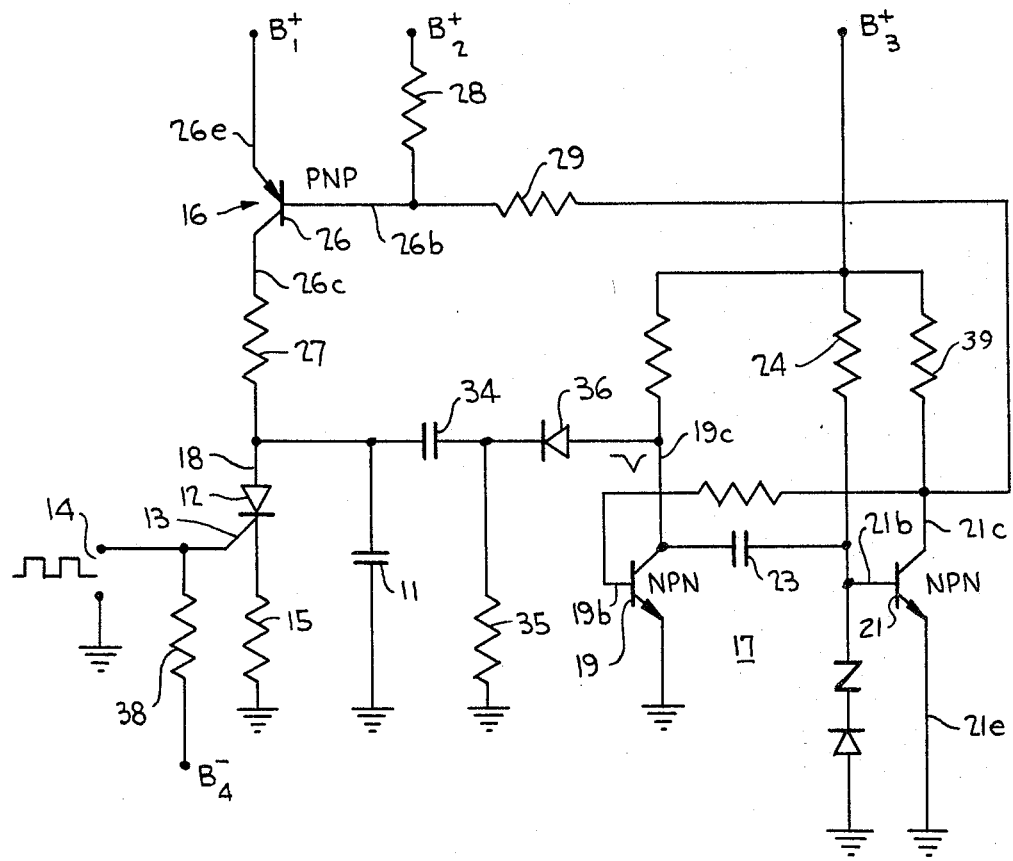

The invention described herein may be manufactured and used by or for the Government of the United States of America for governmental purposes without the payment to me of any royalty thereon.

This invention relates to capacitive firing circuits and more partciularly to a capacitive firing circuit with provision for automatic reset.

In many known prior art circuits especially in the field of fuzing, it is known to use the discharge of a capacitor to actuate some element. The discharge of the capacitor is commonly in response to a small electrical signal input. For example, capacitors are commonly used in conjunction with thyratron type gas filled tubes, where the capacitor is charged and the charge is held on the capacitor until the thyratron is fired by some input signal. In some applications it is desirable to fire then recharge the capacitor several times, and it is desirable that the recharging of the capacitor, and resetting of the system, be automatic.

An object of this invention is to provide a capacitive firing circuit with automatic reset wherein the time for charging and discharging the firing capacitor can be substantially independent.

Another object of this invention is to provide a capacitive firing circuit with automatic reset having entirely solid state components.

These and other objects of this invention are accomplished through the use of a silicon controlled rectifier in conjunction with the firing capacitor, and deriving from the discharge of the capacitor a pulse to automatically reset the firing circuit. This pulse briefly disconnects the power supply, allowing the rectifier to revert to its nonconductive state. When the power supply switches on again the capacitor recharges, the rectifier remaining off.

The specific nature of the invention, as well as other objects, aspects, uses and advantages thereof, will clearly appear from the following description and from the accompanying drawing, in which:

The drawing is a schematic diagram of one embodiment of this invention.

The circuit shown revolves around a firing capacitor 11 and thyratron type device 12 which as shown is a silicon controlled rectifier (SCR). As will be understood by those skilled in the art, the characteristic of the silicon controlled rectifier 12 is such that it will not conduct until a positive pulse of sufficient magnitude is applied to its control electrode 13. A source of such pulses would be applied at the terminals 14. Once conducting, due to a positive pulse, the rectifier 12 continues to conduct as long as the voltage on its anode electrode 18 is maintained above a certain minimum predetermined amount. Therefore, assuming the capacitor 11 is charged, and silicon control rectifier 12 is non-conducting, a positive pulse applied at terminals 14 will cause silicon rectifier 12 to commence conducting, and capacitor 11 will discharge through 12 into a load 15. The circuit and operation thus far described is common in the prior art for "single-shot" capactive discharge circuits. What applicant has provided is the automatic reset (return) of the circuit to its initial condition. This requires that conduction through the silicon control rectifier 12 be extinguished and the capacitor 11 be recharged.

These two functions are achieved by applicant through the use of a transistor switch 16 and a single-shot multivibrator 17. The transistor switch 16 is used both to extinguish conduction through the silicon control rectifier 12 by removing the voltage from its anode electrode 18 and also to control the charging of capacitor 11 from a power supply source $B_1$. The timing sequence of the transistor switch 16 is itself controlled by the single-shot multivibrator 17.

The operation of the single-shot multivibrator is well known in the art and details of its operation may be found in "Electronic Switching, Timing, and Pulse Circuits" by Joseph M. Pettit, published by McGraw-Hill Book Company, Inc., 1959. However, for ease and facility of understanding of this invention, a brief description of the single-shot multivibrator 17 will be given here. The single-shot multivibrator 17 is comprised of two npn transistors 19 and 21. By means of power supply $B_3$ and resistor 24 the base 21$b$ of transistor 21 is maintained at a positive potential with respect to the emitter 21$e$. Transistor 19 is cut off. When a negative spike is applied to the collector 19$c$ of the transistor 19, this negative spike is coupled to the base 21$b$ by means of capacitor 23. This negative spike cuts off transistor 21 raising the potential at its collector 21$c$. This increased potential at 21$c$ is coupled to the base 19$b$ of transistor 19 and it begins to conduct. Transistor 19 continues to conduct until capacitor 23 has been charged through resistor 24 from source $B_3$ to a potential sufficient to turn transistor 21 back on. At this point the potential at the collector 21$c$ drops lowering the potential of base 19$b$ of transistor 19, and transistor 19 again returns to cut-off or non-conducting state.

The operation and construction of switch 16 is as follows. Switch 16 consists of a pnp transistor 26 with its emitter 26$e$ connected to a potential $B_1$ and its collector 26$c$ connected in series with a current limiting resistor 27 and silicon control rectifier 12. A biasing network consisting of power supplies $B_2$ and $B_3$ and resistors 28, 29, and 39 is also provided. With transistor 21 of monostable multivibrator 17 conducting, the potential on emitter 26$e$ of transistor 26 is greater than the bias potential on base 26$b$ and the pnp transistor conducts, which is the closed position of the switch 16. When transistor 21 is cut-off, the potential on base 26$b$ of transistor 26 rises to a value above that on emitter 26 and transistor 26 is cut-off; the open position of the switch.

The overall operation of the capacitor firing circuit with automatic reset which comprises this invention can now be understood. Assume, as an initial condition, the silicon control rectifier 12 to be cut-off and the firing capacitor 11 to be fully charged; under these conditions transistors 21 and 26 will be conducting. A positive pulse applied at terminals 14 turns silicon control rectifier 12 on and initiates conduction therethrough. Capacitor 11 then discharges due to silicon control rectifier 12 into the load 15. The leading edge of the negative pulse produced by the discharge of capacitor 11 into the load 15 is differentiated to produce a negative spike in a differentiating network consisting of a capacitor 34 and a resistor 35. This negative spike is passed by diode 36 and applied to the collector 19$c$ of transistor 19. In the manner previously described, transistor 21, which had been conducting, is cut-off and transistor 19 begins to conduct. When transistor 21 is cut-off the potential at its collector 21$c$ is raised, which in turn raises the potential at the base 26$b$ of transistor 26 via the voltage divider network which includes resistors 28, 29 and 39. Raising the potential on the base 26$b$ of transistor 26 ends conduction through this transistor and the switch 16 is opened. Opening switch 16 disconnects the potential source $B_1$ from the silicon control rectifier 12 allowing the potential on its anode electrode 18 to fall below that predetermined minimum necessary to sustain conduction through the rectifier 12 when the capacitor 11 has substantially fully discharged into load 15.

The timing of the singleshot multivibrator 17 is set to such a value as to allow capacitor 11 to discharge and silicon control rectifier 12 to become extinguished before conduction is again initiated through transistor 21. When the single-shot multivibrator 17 switches from conduction through transistor 19 back to its stable state with conduction through transistor 21, the potential on collector 21c drops allowing the base 26b of transistor 26 to fall below that of the emitter 26e. When this happens conduction is again initiated through transistor 26 and switch 16 is closed. With switch 16 closed capacitor 11 charges through switch 16 and current limiting resistor 27 to the supply voltage $B_1$. With capacitor 11 fully charged and silicon control rectifier 12 extinguished, the capacitive firing circuit has been reset.

As will be apparent to those skilled in the art applicant has provided a simple, novel capacitive firing circuit which can be fired many times in succession with a relatively short interval between firings. The speed of recharge of the firing capacitor 11 is limited only by the time constant of the firing capacitor 11, charging resistor 27, and the saturation resistance of the gate transistor 26. The size of the resistor 27 is determined by the current carrying capacity of the transistor 26 and where fast charging times are desired two transistors may be used in parallel to form the switch 16.

Additionally a negative bias $B_4$ and bias resistor 38 are provided for the control electrode 13 of rectifier 12. This merely insures that conduction will not be initiated by a spurious input signal.

It will be apparent that the embodiments shown are only exemplary and that various modifications can be made in construction and arrangement within the scope of the invention as defined in the appended claims.

I claim as my invention:
1. In apparatus having:
   (a) a firing capacitor,
   (b) a source of charging potential,
   (c) means for charging said capacitor from said source,
   (d) a silicon-controlled rectifier and a load resistor connected in series across said capacitor, and
   (e) means for applying a firing pulse to said silicon-controlled rectifier and for thereby discharging said capacitor through said load,
an improvement for automatically resetting said apparatus after said capacitor has discharged in response to a firing pulse, said improvement comprising:
   (f) a transistor switch having two switching terminals and a control terminal, said switching terminals connected in series between said source of charging potential and said capacitor, said switch being normally conducting,
   (g) means for deriving a fixed-duration pulse from the discharge of said firing capacitor, and
   (h) means for applying said fixed-duration pulse to said control terminal of said transistor switch to stop conduction therethrough for the duration of said fixed-duration pulse,
   (i) whereby the apparatus is automatically reset after each discharge of said capacitor.
2. The invention according to claim 1 wherein said means for deriving a fixed-duration pulse comprises:
   (a) a differentiating circuit connected across said capacitor for obtaining an output spike in response to discharge of said capacitor, and
   (b) a single-shot multivibrator having an input terminal and an output terminal, said input terminal connected to receive said spike from said differentiating circuit and said output terminal connected to said control terminal of said transistor switch.

References Cited by the Examiner

UNITED STATES PATENTS

| 3,085,165 | 4/1963 | Schaffert et al. | 307—88.5 |
| 3,143,665 | 8/1964 | Smith | 307—88.5 |
| 3,184,653 | 5/1965 | Hutson | 317—157.62 |

FOREIGN PATENTS 909,020  10/1962  Great Britain.

ARTHUR GAUSS, *Primary Examiner.*

I. L. SRAGOW, R. J. GARBACIK, J. ZAZWORSKY, *Assistant Examiners.*